United States Patent
Jaworowski et al.

(10) Patent No.: US 6,719,892 B2
(45) Date of Patent: Apr. 13, 2004

(54) SELECTIVE REMOVAL OF BRAZING COMPOUND FROM JOINED ASSEMBLIES

(75) Inventors: Mark Jaworowski, Glastonbury, CT (US); Michael A Kryzman, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 218 days.

(21) Appl. No.: 09/849,068

(22) Filed: May 4, 2001

(65) Prior Publication Data

US 2003/0019761 A1 Jan. 30, 2003

(51) Int. Cl.[7] .............................. C25F 3/00; C25F 7/00
(52) U.S. Cl. ...................... 205/640; 205/684; 205/685; 205/704
(58) Field of Search ................................ 205/640, 674, 205/704, 684

(56) References Cited

U.S. PATENT DOCUMENTS

| | | | | |
|---|---|---|---|---|
| 3,819,494 A | * | 6/1974 | Fountain | 205/640 |
| 3,922,396 A | * | 11/1975 | Speirs et al. | 148/529 |
| 4,142,954 A | * | 3/1979 | Lucas | 205/640 |
| 4,261,804 A | | 4/1981 | McGivern, Jr. | |
| 4,324,626 A | * | 4/1982 | McGivern, Jr. | 205/640 |
| 4,399,096 A | * | 8/1983 | Agarwal et al. | 420/463 |
| 5,431,877 A | * | 7/1995 | Brucken et al. | 205/551 |
| 5,902,421 A | * | 5/1999 | Christy | 148/528 |

* cited by examiner

Primary Examiner—Donald R. Valentine
(74) Attorney, Agent, or Firm—Bachman & LaPointe, P.C.

(57) ABSTRACT

A process for selective removal of a nickel alloy brazing composition from a nickel-base alloy component includes the steps of providing a brazed assembly including nickel-base alloy components joined by nickel alloy brazing composition; immersing the assembly in an electrolyte; and applying a potential across the electrolyte at a magnitude wherein the nickel-base alloy components are electrochemically passive and the nickel alloy brazing composition dissolves whereby the brazing composition is removed from the components.

11 Claims, 3 Drawing Sheets

SELECTIVE REMOVAL OF BRAZING COMPOUND FROM JOINED ASSEMBLIES

BACKGROUND OF THE INVENTION

The invention relates to a process for selective removal of brazing compound from underlying assemblies and, more particularly, to a process for selective removal of a nickel alloy brazing composition from a nickel-base alloy component.

Metal components are often joined by brazing. Brazing compounds have lower melting points than the materials to be joined. When a metal assembly to be joined is heated with brazing compound near the joint, the brazing compound will melt and flow into the joint under capillary action.

The repair of brazed assemblies frequently requires the removal of brazing compound so that the joined components can be separated. Conventional chemical processes for braze removal from gas turbine engine stators can require 120 hours or longer of exposure to aggressive chemical solutions at high temperature (200° F.) under continuous ultrasonic agitation. This process requires the use of complex and non-recyclable stripping solutions, and frequently produces detrimental etching of the components.

It is clear that the need remains for an improved selective process for removing alloy brazing compositions from nickel-base alloy components without using aggressive stripping solutions and the like so as to provide a more environmentally friendly process.

It is therefore the primary object of the present invention to provide such a process.

It is a further object of the invention to provide such a process wherein the materials used can be recycled so as to reduce environmental impact and cost as well.

Other objects and advantages will appear hereinbelow.

SUMMARY OF THE INVENTION

In accordance with the present invention, the foregoing objects and advantages have been readily attained.

In accordance with the present invention, a process is provided which comprises the steps of providing a brazed assembly comprising nickel-base alloy components joined by nickel alloy brazing composition; immersing said assembly in an electrolyte; and applying a potential across said electrolyte at a magnitude wherein said nickel-base alloy components are electrochemically passive and said nickel alloy brazing composition dissolves whereby said brazing composition is removed from said components.

BRIEF DESCRIPTION OF THE DRAWINGS

A detailed description of preferred embodiments of the present invention follows, with reference to the attached drawings, wherein.

DETAILED DESCRIPTION

Figure 1A:
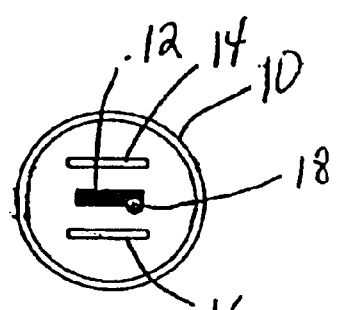
FIGS. 1a, b and c schematically illustrate a process in accordance with the present invention.

The invention relates to a process for selective removal of nickel alloy brazing compositions from a nickel-base alloy component. In accordance with the present invention, the process has been developed such that the brazing composition is selectively removed without etching or damaging the underlying components and without the need for aggressive chemicals at high temperatures. Further, the present process does not require the use of non-recyclable stripping solutions.

A typical environment of use for the process of the present invention is in removing brazing composition from a brazed assembly wherein several nickel-base alloy components are joined together by the brazing composition. It is desirable to remove the brazing composition so as to obtain clean and re-useable underlying components without damaging the underlying components.

The brazing composition has a lower melting point than the material of the components.

In accordance with the invention, the brazing composition is selectively removed by immersing the entire assembly including components and brazing composition in a suitable electrolyte or electrolyte-containing solution, and applying a potential across the electrolyte at a magnitude selected so as to dissolve the brazing composition while the underlying components are electrochemically passive whereby the brazing composition is removed without substantial damage to the underlying components.

Particularly suitable combinations of brazing composition and component materials include nickel-chromium alloy brazing composition and nickel-chromium alloy components.

The brazing composition is more preferably a nickel-chromium alloy containing boron, silicon, iron and small amounts of carbon, for example as described in Table 1:

TABLE 1

| Cr: | 7.0% wt. |
|---|---|
| B: | 3.10% wt. |
| Si: | 4.50% wt. |
| Fe: | 3.0% wt. |
| C: | 0.06% wt. max |
| Ni: | remainder. |

The underlying nickel-chromium alloy components are preferably nickel-chromium alloy containing iron, titanium, niobium, tantalum and aluminum, and may also suitably contain manganese, cobalt, carbon, silicon, copper and small amounts of sulfur. The nominal composition, by weight percent, may for example be as set forth in Table 2:

TABLE 2

| | C | Mn | Si | S | Cr | Co | Nb + Ta | Ni | Cu | Ti | Al | Fe | |
|---|---|---|---|---|---|---|---|---|---|---|---|---|---|
| Min | — | — | — | — | 14.0 | — | 0.70 | 70.0 | — | 2.25 | 0.40 | 5.0 | % |
| Max | 0.80 | 1.00 | 0.50 | 0.01 | 17.0 | 1.0 | 1.20 | — | 0.50 | 2.75 | 1.00 | 9.0 | % |

This combination of nickel-chromium alloy braze containing appreciable amounts of boron, silicon and iron and components of nickel-chromium alloy containing iron, titanium, niobium and/or tantalum, and aluminum has been found particularly well suited to use in the method of the present invention for removing the braze from the component.

In accordance with the present invention, it has been found that particularly desirable electrolytes for use in removing nickel alloy brazing compositions from nickel-base alloy components are mineral acid solutions such as solutions containing HCl, $HNO_3$ and the like. In accordance with the invention, excellent results have been obtained utilizing such solutions at a concentration of 5% volume of the mineral acid in water, at potentials in the range of greater than 0.0 and up to about 1.0 volts versus a Ag/AgCl reference.

In accordance with the invention, a potential is applied across the electrolyte, for example versus a silver/silver chloride reference electrode, and potential is applied at a magnitude which provides for a relatively high dissolution rate of the brazing composition while the underlying nickel-base alloy components are electrochemically passive.

The assembly is immersed and potential applied for a suitable period of time until the brazing composition is sufficiently removed from various components and, preferably, the components of the assembly can be removed and separated.

When necessary and/or at the conclusion of the process, the used solution can readily be recycled, for example using known techniques such as distillation and diffusion dialysis, so as to provide recycled mineral acid solution for use in further processes in accordance with the present invention.

The process can advantageously be carried out at ambient temperature, and ultrasonic agitation is not needed.

It may be desirable to apply a gentle agitation to the solution using any suitable means, for example so as to mix at a rate equivalent to approximately 150 rpm. At a lab scale, this can be accomplished by positioning a magnetic stirring bar in the electrolyte solution.

It may also be desirable to remove and replace the solution after certain periods of time. In this case, the removed solution can advantageously be recycled as described above, and fresh or recycled solution can be fed to the chamber or cell wherein the process is being carried out.

Figure 1B:
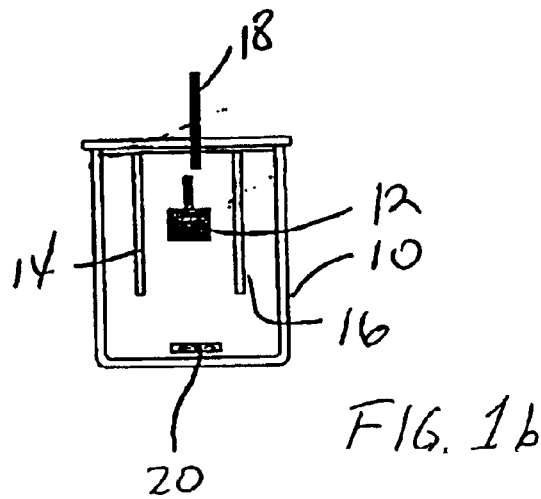
Figure 1C:
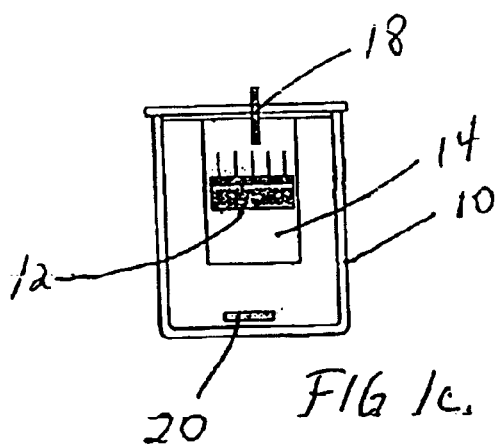

FIG. 1 schematically illustrates a process in accordance with the present invention. As shown in FIG. 1, a suitable vessel 10 is provided, and an assembly 12 to be treated is positioned therein. Assembly 12 is preferably positioned between cathodes 14, 16, which may advantageously be graphite cathodes, and a reference electrode 18 is positioned extending into the solution.

Assembly 12 may advantageously be suspended in a solution contained within vessel 10, and structures used to suspend assembly 12 should be selected of a material which will not be affected by the conditions and materials within vessel 10. For example, in accordance with the present invention, titanium wire is particularly suitable for securing assembly 12 as desired.

As set forth above, it may be desirable to agitate the electrolyte solution within the vessel 10, and this may be accomplished, for example using any suitable mixing or agitation device as would be readily known to a person skilled in the art. As set forth above, agitation may be accomplished at lab scale using a magnetic stirring bar 20 as shown.

As will be demonstrated in the following example, the process of the present invention provides for effective removal of nickel brazing composition from underlying nickel-based components while avoiding etching or other damage to the components, and this is accomplished using environmentally friendly recyclable materials.

EXAMPLE 1

This example illustrates the beneficial results obtained using a selective removal process in accordance with the present invention.

In this example, removal of an AMS 4777 nickel alloy braze from IN-X750 nickel base alloy is demonstrated.

The AMS 4777 nickel alloy braze had a composition as follows:

| | |
|---|---|
| Cr | 7.0 |
| B | 3.10 |
| Si | 4.50 |
| Fe | 3.0 |
| C | 0.06 max |
| Ni | REM |

The IN-X750 nickel base alloy had a nominal composition as follows:

| | C | Mn | Si | S | Cr | Co | Nb + Ta | Ni | Cu | Ti | Al | Fe | |
|---|---|---|---|---|---|---|---|---|---|---|---|---|---|
| Min | — | — | — | — | 14.0 | — | 0.70 | 70.0 | — | 2.25 | 0.40 | 5.0 | % |
| Max | 0.80 | 1.00 | 0.50 | 0.01 | 17.0 | 1.0 | 1.20 | — | 0.50 | 2.75 | 1.00 | 9.0 | % |

Figure 2:
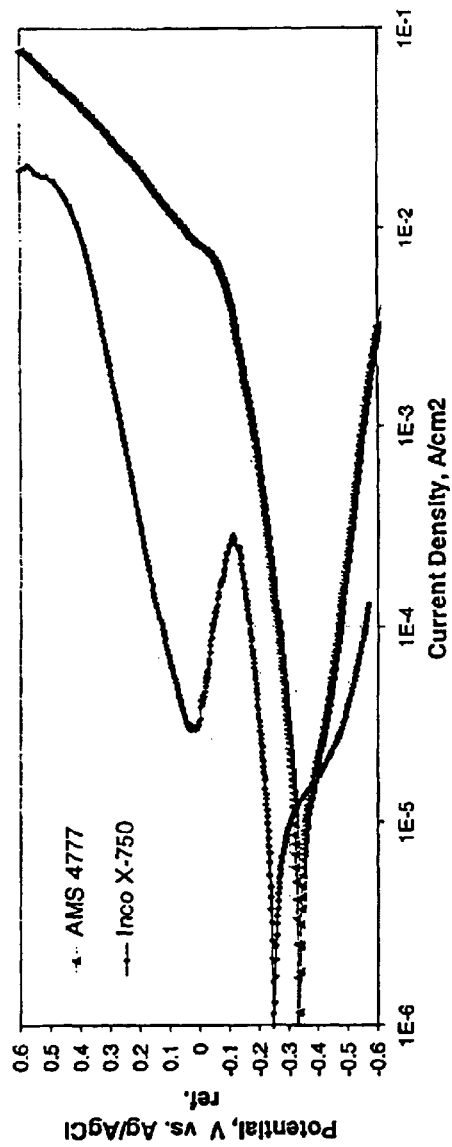
FIG. 2 illustrates the relationship between potential versus a silver/silver chloride electrode and current density for a nickel alloy braze composition (AMS 4777) and a nickel base alloy component (INCO X-750)

Referring to FIG. 2, it can be seen that in a solution of 5 volume % hydrochloric acid in water, the IN-X750 base metal is electrochemically passive between the potentials of 0.0 and 0.1 volts versus a silver/silver chloride reference electrode. From the same figure, it can be seen that the AMS 4777 brazing compound dissolves at a relatively high rate (corresponding to a corrosion current density of approximately $10^{-2}$ A/cm$^2$) in this same regime.

The selective removal of AMS 4777 braze from an IN-X750 component was demonstrated. The component was a section of a PW2000 10th stage HPC stator inner shroud.

A PW2000 10th stage inner shroud section with five vane stubs was suspended in a 2-liter stripping cell as shown in FIG. 1. The specimen was approximately four inches in length. Honeycomb material was brazed to the inner diameter of the piece.

Initially, 0.010" diameter Inconel 600 wire was used to suspend the sample in the cell. This wire corroded and failed after 24 hours of testing and was replaced with 99.997% purity titanium wire for the remainder of the test.

The cell was filled with a 5 volume % solution of technical grade HCl. Gentle magnetic stirring (150 rpm) was used. The sample was polarized to 0.035 V vs. a silver/silver chloride reference electrode. The stripping current was recorded during the run.

The solution was replaced after 16 and 41 hours.

The sample was removed and inspected after 4,8, 16,24, 64 and 89 hours.

Figure 3:
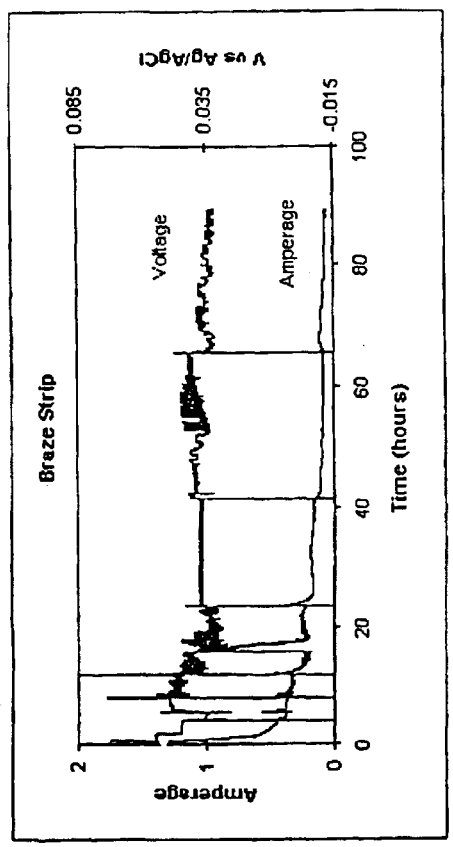
FIG. 3 illustrates the electrochemical record of a braze stripping run in accordance with the present invention.

The current drawn by the sample decreased as the exposed braze area was reduced as shown FIG. 3.

After 4 hours of the strip cycle, the braze fillets were approximately their original size. A black smut was produced on the vane stubs. The stator base metal was brightened.

After 8 hours, much of the external braze was removed. The braze joint laminating the two pieces of sheet metal forming the inner shroud was etched.

After 16 hours, all exterior braze on the OD was removed and the rounded braze fillet was stripped flush with the stator OD. The brown scale on the specimen was removed and engraved serial numbers rendered visible. The machined, smooth surface IN-X750 showed no sign of attack.

After 41 hours, the braze joint was stripped to a depth of approximately 50% of the pocket.

After 64 hours, one vane was lightly loose to finger pressure. Rinse water was observed in all of the braze pockets even after repeated compressed air blasting. It was concluded that all of the vane pocket braze joints had perforated to the underlying honeycomb, where water was trapped in the cells and available to wick through the vane pocket. The vanes were file notched to identify them. The process of hand filing the notches produced motion in all five vane sections. The machined, smooth surface IN-X750 still showed no sign of attack.

After 89 hours, the vanes were hand-removable from the pockets of the stator. The honeycomb detached from the inner shroud with light hand pressure. The machined edge of the shroud retained a bright reflective finish.

Figure 4B:
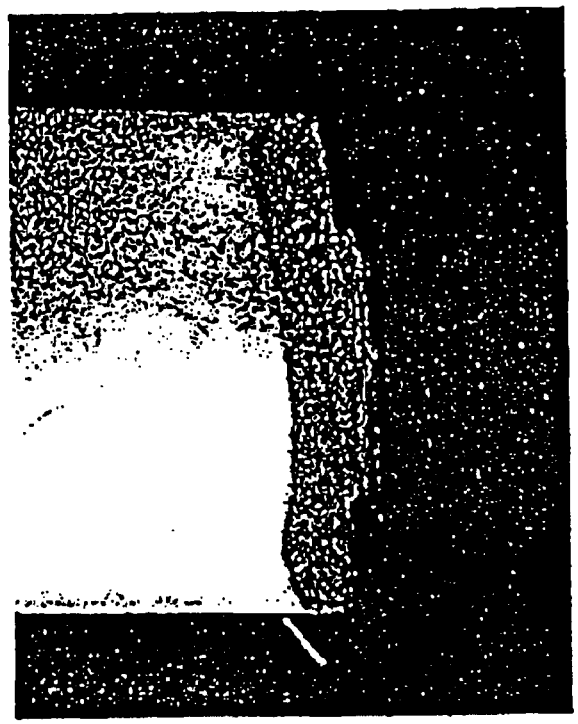
FIGS. 4a and b show results of a selective process in accordance with the present invention on a stator pocket (FIG. a) and a vane stub (FIG. 4b).
Figure 4A:

FIGS. 4a and 4b show, respectively, a stator pocket and vane stub after the process of the present invention. As shown, the stator pocket is free of residual braze, and the vane stub was cleanly removed from the stator pocket.

EXAMPLE 2

This example illustrates current density which is proportional to dissolution rate using different acids.

Electrochemical measurements on braze material AMS 4777 were made in 4 mineral acids (HCl, HNO$_3$, H$_2$SO$_4$ and H$_3$PO$_4$) at 3 different concentrations of each acid, 5, 10, and 15 volume % of a concentrated technical grade reagent. The measurements were conducted in an EG&G flat cell with 1 cm$^2$ exposed area of the specimen. The potential was controlled versus Ag/AgCl reference electrode and a high density graphite rod was used as a counter electrode. Polarization scans in all test were from −0.3 V to 1.2 V versus open circuit potential. The Scan rate was 1 V/hr in all tests.

The current density (which is proportional to the dissolution rate of AMS 4777) in the passive region of the Iconel X-750 was ranging for the different acids as follows:

| | |
|---|---|
| HCl | 10–100 mA/cm$^2$ |
| HNO$_3$ | 2–30 mA/cm$^2$ |
| H$_2$SO$_4$ | 5–20 mA/cm$^2$ |
| H$_3$PO$_4$ | 2–6 mA/cm$^2$ |

As can be seen the hydrochloric acid provides much higher dissolution rate than the other acids, which makes this acid particularly advantageous for use in the present invention.

It should be readily apparent that the process in accordance with the present invention provides for advantageous selective removal of brazing composition without damage to the underlying components, and further without using non-recyclable materials under harsh conditions.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for selective removal of a nickel alloy brazing composition from a nickel-base alloy component, comprising the steps of:

providing a brazed assembly comprising nickel-base alloy components joined by nickel alloy brazing composition, wherein said nickel-base alloy components are provided from a material having a nominal composition as follows:

| | C | Mn | Si | S | Cr | Co | Nb + Ta |
|---|---|---|---|---|---|---|---|
| Min | — | — | — | — | 14.0 | — | 0.70 |
| Max | 0.80 | 1.00 | 0.50 | 0.01 | 17.0 | 1.0 | 1.20 |
| | Ni | Cu | Ti | Al | Fe | — | |
| Min | 0.70 | — | 2.25 | 0.40 | 5.0 | % | |
| Max | — | 0.50 | 2.75 | 1.00 | 9.0 | % | | immersing said assembly in an electrolyte; and
applying a potential across said electrolyte at a magnitude wherein said nickel-base alloy components are electrochemically passive and said nickel alloy brazing composition dissolves whereby said brazing composition is removed from said components.

2. The process of claim 1, wherein said electrolyte comprises a mineral acid solution.

3. The process of claim 2, wherein said mineral acid solution is selected from the group consisting of solutions containing HCl, HNO$_3$ and mixtures thereof.

4. The process of claim 1, wherein said potential is greater than 0.0 and up to about 1.0 volts versus a Ag/AgCl reference electrode.

5. The process of claim 1, wherein said brazing composition has a lower melting point than said components.

6. The process of claim 1, wherein said brazing composition comprises nickel-chromium alloy brazing composition and wherein said components comprise nickel-chromium alloy components.

7. The process of claim 1, wherein said brazing composition has a composition as follows:

| | |
|---|---|
| Cr: | 7.0% wt. |
| B: | 3.10% wt. |
| Si: | 4.50% wt. |
| Fe: | 3.0% wt. |
| C: | 0.06% wt. max |
| Ni: | remainder. |

8. The process of claim 1, wherein said brazing composition is a nickel-chromium alloy containing boron, silicon and iron, and said nickel-base alloy components are provided of a nickel-chromium alloy containing iron, titanium, at least one of niobium and tantalum, and aluminum.

9. The process of claim 1, wherein the electrolyte consists essentially of a solution of one mineral acid selected from the group consisting of HCl and HNO$_3$.

10. A process for selective removal of a nickel alloy brazing composition from a nickel-base alloy component, comprising the steps of:

providing a brazed assembly comprising nickel-base alloy components joined by nickel alloy brazing composition;

immersing said assembly in an electrolyte; and applying a potential across said electrolyte at a magnitude wherein said nickel-base alloy components are electrochemically passive and said nickel alloy brazing composition dissolves whereby said brazing composition is removed from said components, wherein said potential is greater than 0.0 and up to about 1.0 volts versus a Ag/AgCl reference electrode.

11. A process for selective removal of a nickel alloy brazing composition from a nickel-base alloy component, comprising the steps of:

providing a brazed assembly comprising nickel-base alloy components joined by nickel alloy brazing composition;

immersing said assembly in an electrolyte, wherein the electrolyte consists essentially of a solution of one mineral acid selected from the group consisting of HCl and HNO$_3$; and applying a potential across said electrolyte at a magnitude wherein said nickel-base alloy components are electrochemically passive and said nickel alloy brazing composition dissolves whereby said brazing composition is removed from said components.

* * * * *